US006618362B1

(12) United States Patent
Terranova

(10) Patent No.: US 6,618,362 B1
(45) Date of Patent: Sep. 9, 2003

(54) APPARATUS AND METHOD FOR USING A TRANSPONDER AS AN INFORMATION BUFFER

(75) Inventor: Steven N. Terranova, Durham, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 09/119,893

(22) Filed: Jul. 21, 1998

(51) Int. Cl.[7] .................................................. H04Q 7/00
(52) U.S. Cl. ........................................ 370/328; 370/277
(58) Field of Search ................................. 370/277, 278, 370/282, 479, 425, 426, 328, 279, 310; 700/302

(56) References Cited

U.S. PATENT DOCUMENTS 5,605,182 A * 2/1997 Oberrecht et al. ............ 141/94
6,078,888 A * 6/2000 Johnson, Jr. ................... 705/1
6,157,871 A * 12/2000 Terranova ................... 700/231
6,169,938 B1 * 1/2001 Hartsell, Jr. ................ 700/302

* cited by examiner

*Primary Examiner*—Alpus H. Hsu
*Assistant Examiner*—Thien D Tran
(74) *Attorney, Agent, or Firm*—Withrow & Terranova PLLC

(57) ABSTRACT

The invention provides a transponder acting as a memory buffer facilitating information or message transfer between a remote communication system, such as a fuel dispenser, and the vehicle control system. Information written to the transponder memory from the fuel dispenser may be sent to or retrieved by the vehicle control system. Information sent to the transponder from the vehicle control system is made accessible by or transmitted to the fuel dispenser. The transponder includes sufficient communication electronics, memory access and communication control circuitry, and memory to allow storing of information and access to information by both the vehicle control system and the fuel dispenser.

13 Claims, 7 Drawing Sheets

APPARATUS AND METHOD FOR USING A TRANSPONDER AS AN INFORMATION BUFFER

BACKGROUND OF THE INVENTION

The present invention relates generally to transponders and, more particularly, to transponders configured to provide an information buffer between a vehicle's communication system and a remote radio frequency communication system, such as that found associated with fuel dispensers in a fueling environment.

In recent years, traditional gasoline pumps and service stations have evolved into elaborate point-of-sale (POS) devices having sophisticated control electronics and user interfaces with large displays and touch-pads or screens. The dispensers include various types of payment means, such as card readers and cash acceptors, to expedite and further enhance fueling transactions. A customer is not limited to the purchase of fuel at the dispenser. More recent dispensers allow the customer to purchase services, such as car washes, and goods, such as fast food or convenience store products at the dispenser. Once purchased, the customer need only pick up the goods and services at the station store or the outlet of a vending machine.

Remote transaction systems have evolved wherein the fuel dispenser is adapted to communicate with various types of remote communication devices, such as transponders, to provide various types of identification and information to the fuel dispenser automatically. Given the sophistication of these transaction systems and the numerous choices provided to the customer at the dispenser, conducting transactions with transponders will be useful to allow the dispenser and fuel station store to monitor the movement of a person carrying a transponder and a vehicle having a transponder, enhance transaction and marketing efficiencies, and improve safety in the fueling environment.

Currently, transponder applications in a fueling environment have been limited to the extent that a fuel dispenser is configured to retrieve a customer ID from an interrogator transponder, send that ID to remote host computer to be associated with the customer's debit/credit account and charge the fueling transaction to the accessed account. Many transponders have local user memory areas for use as a scratch pad in future applications. This scratch pad memory area provides the unique ability for the transponder to store various types of information, provide fleet fueling information, loyalty points, and car wash or other access codes. For additional information, see U.S. application Ser. No. 60/060,066 filed Sep. 26, 1997, entitled Comprehensive Intelligent Fueling; Ser. No. 09/024,742 filed Feb. 17, 1998, entitled Fuel Dispensing System Providing Customer Preferences; Ser. No. 09/024,499 filed Feb. 17, 1998, entitled Fuel Dispensing System Preventing Customer Drive-Off; Ser. No. 09/024,493 filed Feb. 17, 1998, entitled Fuel Dispensing And Retail System For Providing Loyalty And Customer Benefits; Ser. No. 09/024,275 filed Feb. 17, 1998, entitled Fuel Dispensing And Retail System For Preventing Use Of Stolen Transponders; Ser. No. 09/024,549 filed Feb. 17, 1998, entitled Providing Transaction Estimates In A Fueling And Retail System; Ser. No. 09/024,491 filed Feb. 17, 1998, entitled Fuel Dispensing And Retail System Providing A Transaction Discount For Transponder Use; Ser. No. 09,034,969 filed Mar. 4, 1998, entitled Multistage Ordering System For A Fueling And Retail Environment; Ser. No. 09/035,158 filed Mar. 5, 1998, entitled Fuel Dispensing And Retail System Providing For Transponder Prepayment; and Ser. No. 09/037,489 filed Mar. 10, 1998, entitled Antenna Placement In A Fueling And Retail System, the disclosures of which are incorporated herein by reference.

While the petroleum industry is working to provide remote communications to customers and their vehicles, there is an increasing effort by automotive manufacturers to provide on-board computer systems for electronic control and diagnostics. Since computers are becoming cheaper and increasingly able to handle a variety of tasks in a short amount of time, it is inevitable that a computer on board an automobile will eventually provide an interface with the occupants of the automobile just as a personal computer at a home or business provides. With the increasing amount of data network services, computers are able to remotely access information, rather than store the information locally. The difficulty arises in determining how an automobile with an on-board computer system can obtain access to the outside world for data network services or other services without a physical connection to the automobile in a cost-effective and widely compatible manner.

SUMMARY OF THE INVENTION

The present invention provides a solution by transferring information between an automobile and a remote communication system via a transponder capable of communicating with the remote communication system, as well as a vehicle control system. Preferably, the remote communication is a fuel dispenser or is associated with a fueling and restaurant environment, which is in turn in communication with remote or local data network services. The transponder is configured to be mounted on the vehicle and communicate with the vehicle control system electronically or via radio frequency communications. The transponder is preferably directly linked to the on-board computer system in the vehicle and configured to act as a peripheral. The term "transponder" is used to define any type of remote communication device providing bidirectional radio communications and should not be limited to classic transponders that modify received signals to generate signals for transmission.

Whenever an automobile pulls up to the fuel dispenser, the transponder is awakened when interrogated by an interrogation device associated with the fuel dispenser. The transponder will recognize that a fuel dispenser is requesting information, such as the customer ID or account information. The transponder may send a signal or interrupt to the on-board vehicle control system indicating that a fuel dispenser is requesting the customer ID or information, and the vehicle control system may then signal back to the transponder giving it directions to either respond or not respond. The vehicle control system could even signal the occupants of the automobile for instructions as to whether the fuel transaction authorization should be initiated. Alternatively, certain basic information, which may include the customer or transponder ID, may be stored on the transponder and immediately sent back to the dispenser upon interrogation in order to establish communications and expedite transaction authorization.

In addition to the fueling process, the vehicle control system may signal the transponder to send requests for information to the fuel dispenser. For instance, if the on-board vehicle control system would like to request that the fuel dispenser download e-mail, the control system will signal the transponder to make that request to the fuel dispenser. The fuel dispenser may send a request on to the site computer which in turn will know whether it is capable of providing such a request. If such a request is possible, the fuel dispenser could signal the transponder, which would in turn signal the computer as necessary to communicate the downloaded e-mail.

The vehicle may have the ability to link a remote computer or lap-top computer to the transponder without going through an on-board computer or going through the vehicle control system.

The fuel dispenser preferably has the ability to provide network data services or other information directly to the vehicle control system via the transponder. The vehicle control system could be a computer hardware system with a microprocessor, memory, peripheral control and interfacing, and an operating system. The operating system may range from being very simple to a more complex Windows®-based system. The software may be embedded into the vehicle control system or may be loadable as on a personal computer, directly or through the transponder. An example of a complex software system would be Microsoft® Windows CE operating system.

In operation, the vehicle control system may be in complete control of all peripherals connected to it. A transponder could be connected as a peripheral to the on-board computer's microprocessor or connected to a communication's bus, to which all other peripherals are connected. In either event, the transponder could achieve communication with the vehicle control system through interrupts and serial communications to provide direct memory access.

Preferably, the fuel dispenser includes an interrogation device capable of querying for the presence of the transponder, transmitting information to the transponder and receiving information from the transponder. The information may be transmitted to or from a central site controller which may have access to card authorization host computers, data network services, such as Microsoft Network, America On-Line, and other network service providers to the Internet or proprietary networks.

In particular, the transponder is preferably a memory buffer facilitating information or message transfer between a remote communication system, such as a fuel dispenser and the vehicle control system. Information written to the transponder memory from the fuel dispenser may be sent to or retrieved by the vehicle control system. Information sent to the transponder from the vehicle control system is made accessible by or transmitted to the fuel dispenser. The transponder includes sufficient communication electronics, memory access and communication control circuitry, and memory to allow storing of information and access to information by both the vehicle control system and the fuel dispenser.

Preferably, the memory access control circuitry is configured to establish communications with the dispenser, at least initially, without interacting with the vehicle control system. Once communications are established, the vehicle control system will write information or messages to the transponder memory, and the dispenser will access those messages and respond accordingly. Similarly, the dispenser will write messages to the transponder memory for access by the vehicle control system. In other words, the transponder provides a memory buffer accessible by both the vehicle control system and the remote communication system to facilitate communications between the two.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
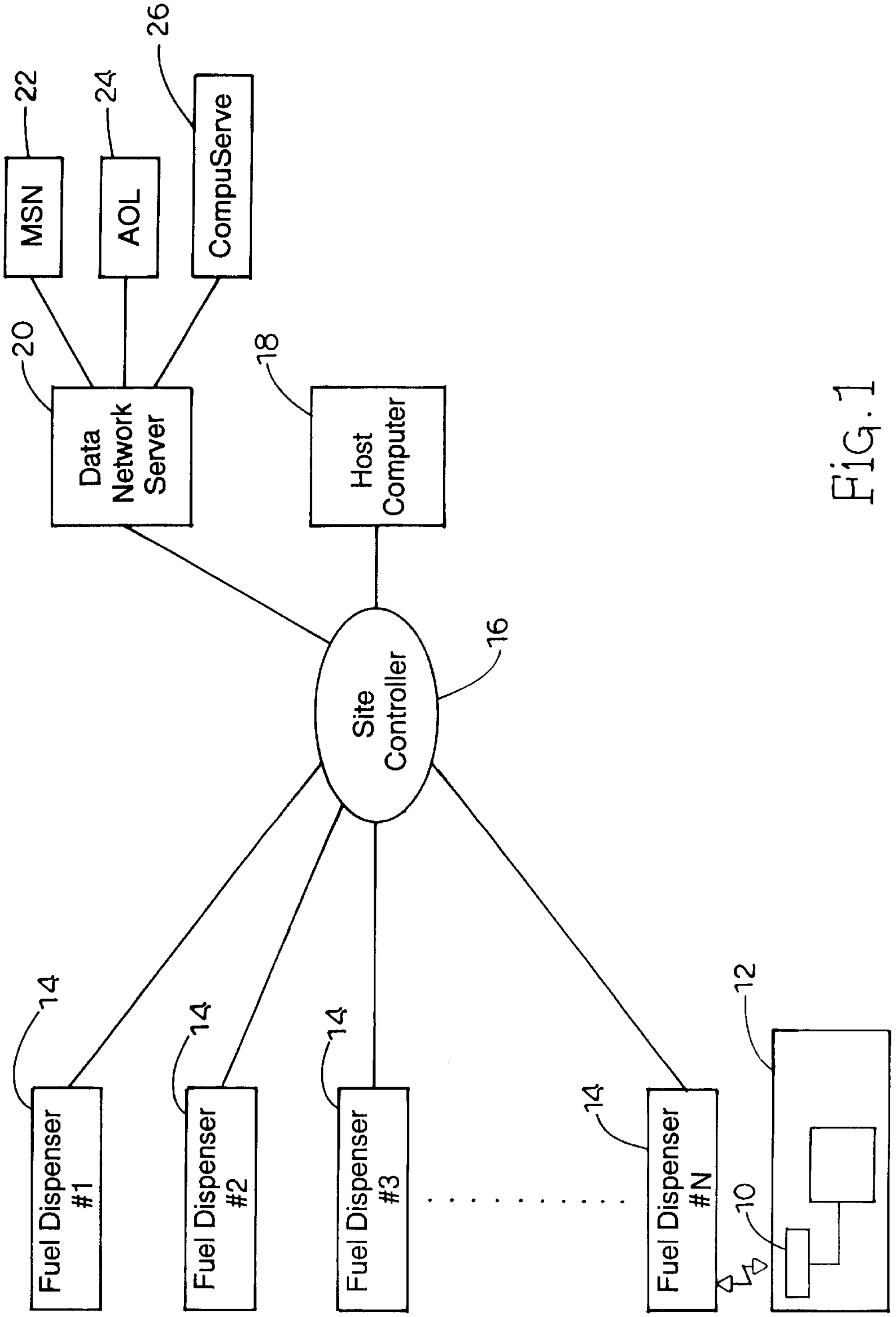
FIG. 1 is a schematic of a fueling environment.

In the following description, like reference characters designate like or corresponding parts throughout the several views. It should be understood that the illustrations are for the purpose of describing preferred embodiments of the invention and are not intended to limit the invention thereto. The scope of the patent is commensurate to the concept disclosed, not merely the embodiments discussed herein.

As best seen in FIG. 1, the transponder buffer, generally designated 10, is shown mounted to a vehicle 12 and communicably coupled to a vehicle control system 100. The vehicle 12 is shown in a fueling and retail environment having a plurality of fuel dispensers 14 coupled to a centralized site 16, which is in further communication with a host computer or network 18 and a data network server 20. The data network server 20 may provide access to various network or Internet services such as the Microsoft Network (MSN), America On-Line (AOL) and CompuServe. The fueling environment may also include quick-serve restaurants, car washes and vending facilities, all of which may act as remote communication systems in a fashion similar to that of the fuel dispensers 14 described herein.

Figure 2:
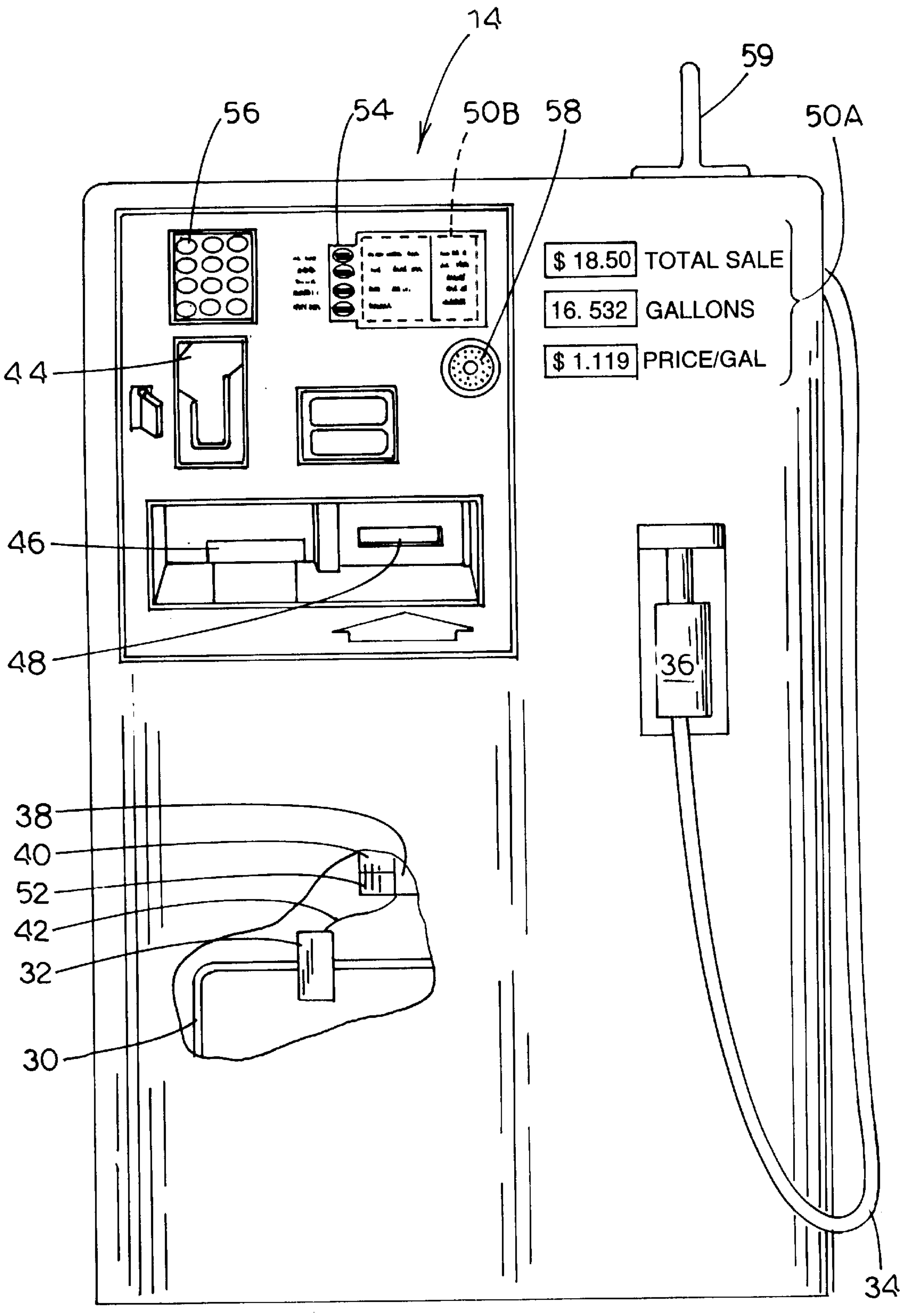
FIG. 2 is a schematic of a fuel dispenser.

As best seen in FIG. 2, a fuel dispenser 14 is shown constructed according to and as part of the present invention. The dispenser provides a fuel delivery path from an underground storage tank (not shown) to the vehicle 12. The delivery path includes a fuel delivery line 30 having a fuel metering device 32. The fuel delivery line 30 communicates with a fuel delivery hose 34 outside of the dispenser 14 and a delivery nozzle 36. The nozzle 36 provides manual control of fuel delivery to the vehicle 12.

The dispenser 14 also includes a dispenser control system 38 having one or more controllers 39 and associated memory 40. The dispenser control system 38 may receive volume data from the metering device 32 through cabling 42 as well as provide control of fuel delivery. The dispenser control system 38 may provide audible signals to an audio module and speaker 58 in order to provide various beeps, tones and audible messages to a customer. These messages may include warnings, instructions, advertising, and any other information desired.

The dispenser 14 is preferably equipped with a payment acceptor, such as a card reader 44 or cash acceptor 46, along with a receipt printer 48. With these options, the dispenser control system 38 may read data from the magnetic strip of a card inserted in the card reader 44 or receive cash from a customer and communicate such information to the central control system 16 (as shown in FIG. 1), such as the G-site controller sold by Gilbarco Inc., 7300 West Friendly Avenue, Greensboro, N.C. The central control system 16 typically communicates with a remote network host computer 18, such as a card verification authority, to ascertain whether a transaction proposed to be charged to or debited from an account associated with the card inserted in the card reader 44 is authorized.

The dispenser 14 will include one or more types of displays, preferably one or more alpha-numeric displays 50A together with a high-resolution graphics display 50B. The graphics display 50B will generally have an associated key pad 54 adjacent to the display or integrated with the display to provide a touch interface. The dispenser may include an additional, auxiliary key pad 56 associated with the card reader 44 for entering secret codes or personal identification numbers (PIN's). Notably, the displays 50A, 50B and key pads 54, 56 may be integrated into a single device and/or touch interface. The dispenser control system 38 is preferably comparable to the microprocessor-based control systems used in CRIND (card reader in dispenser) and TRIND (tag or transponder reader in dispenser) type units sold by Gilbarco Inc. under the trademark THE ADVANTAGE.

As noted, the dispenser control system 38 may include or be associated with dispenser communication electronics 52 for providing remote unidirectional or bidirectional communications, preferably RF Communications, between a transponder and the dispenser. These transponders may incorporate Texas Instruments RFID electronics or the Micron Microstamp™ produced by Micron Communications, Inc., 8000 South Federal Way, Boise, Id. 83707-0006. Other radio frequency communication systems are equally acceptable. Additionally, the dispenser 14 may include one or more antennas 59 associated with communications electronics 52.

Attention is drawn to U.S. Pat. Nos. 5,621,913; 5,608,739; 5,583,850; 5,572,226; 5,558,679; 5,557,780; 5,552,743; 5,539,775; 5,500,650; 5,497,140; 5,479,416; 5,448,110; 5,365,551; 5,323,150 and 5,302,239, owned by Micron Technology, Inc. the disclosures of which are incorporated herein by reference.

Figure 3:
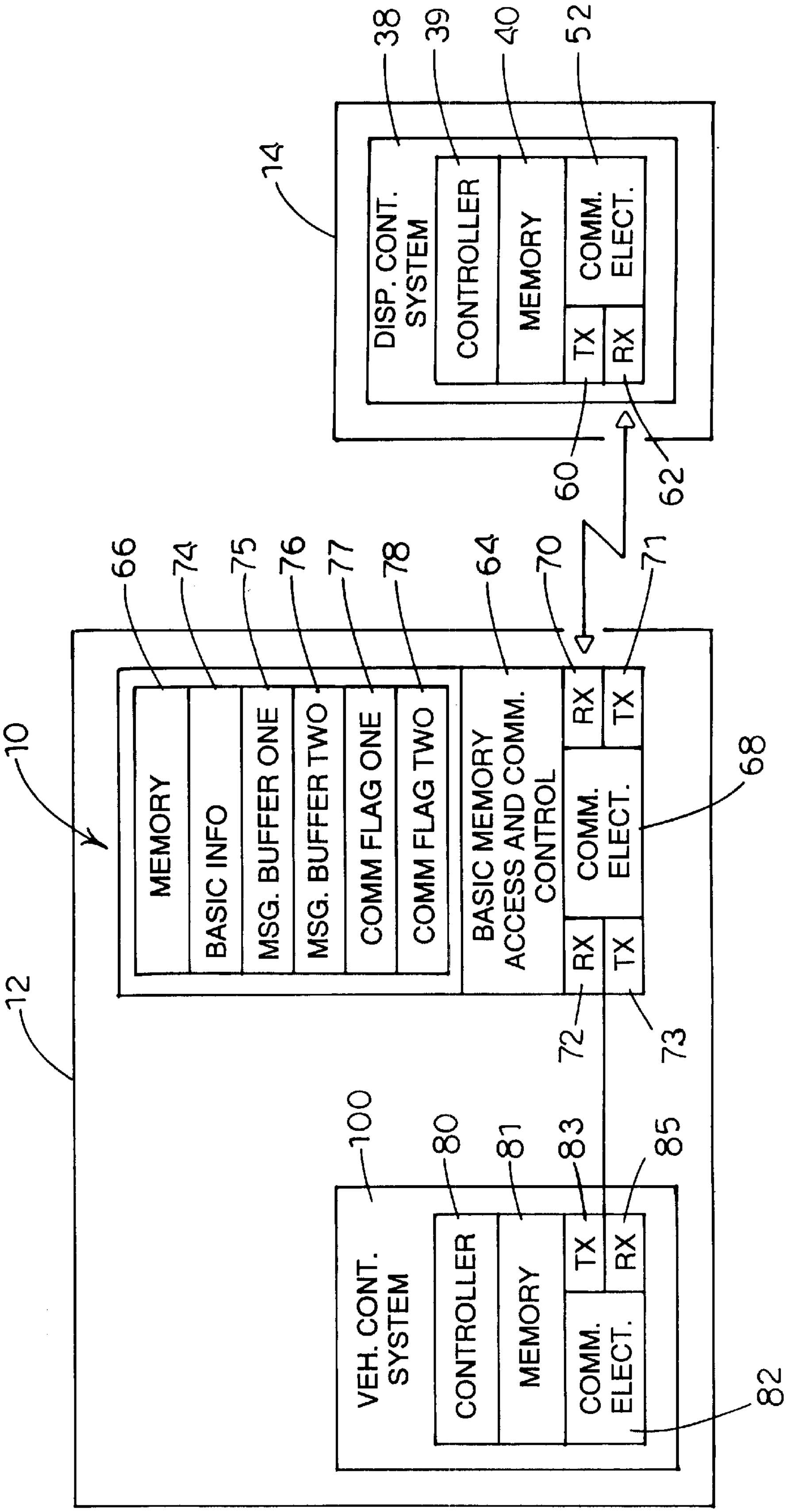
FIG. 3 is a block diagram of a fuel dispenser and a vehicle having a vehicle control system and a transponder buffer.

Turning now to FIG. 3, the basic structure of the vehicle control system 100, transponder buffer 10, and fuel dispenser 14 are shown. As noted above, fuel dispenser 14 includes a dispenser control system 38, which includes or is associated with a controller 39, memory 40, and communication electronics 52 having a transmitter 60 and receiver 62. The communication electronics 52 preferably transmits spread spectrum signals via transmitter 60 and receives backscattered radio frequency signals via receiver 62.

Vehicle 12 will include a vehicle control system 100 communicably associated with a transponder buffer 10 mounted on the vehicle in a location facilitating communications, and preferably radio frequency communications with the communication electronics associated with the dispenser control system 38. The transponder buffer includes basic memory access and communication circuitry 64 cooperating with memory 66 and communication electronics 68. Communication electronics include a receiver 70 and transmitter 71 configured to provided remote communications with the communication electronics 52 of the dispenser 14, as well as a receiver 72 and transmitter 73 configured to directly or remotely communicate with the communication electronics 82 of the vehicle control system 100.

The memory 66 of transponder buffer 10 may have various configurations depending on the embodiment chosen. For example, memory 66 may have one message buffer 75 for storing messages transferred from the dispenser 14 to the vehicle control system 100 and from the vehicle control system 100 for the dispenser 14. Alternatively, message buffer one 75 may be accompanied by message buffer two 76 wherein one message buffer is used for messages transmitted from the dispenser 14 to be accessed by the vehicle control system 100, and message buffer two 76 is used to store messages transmitted from the vehicle control system 100 for access by the dispenser 14. The first embodiment may be preferable when transponder memory is at a minimum while the second embodiment may be preferred when there is sufficient memory to provide simultaneous communications where information may be written to the memory or read therefrom simultaneously by the vehicle control system and the dispenser 14.

In yet another embodiment, having one, two or more message buffers, a basic information buffer 74 may be used to store information. Buffer 74 may be used to store information such as customer or transponder ID's, account information or other types of information required to establish communications where necessary for quick dispenser access during initial interrogation sequences. In this embodiment, the memory access and communication control circuitry 64 may access the basic information in the basic information buffer 74 upon initial interrogation and transmit the information to the dispenser 14. The dispenser control system 38 may use the basic information (e.g., equipped with a transponder buffer, associated with an intelligent vehicle control system, or communication protocol device type, etc.) to determine the type of transponder, the device's level of sophistication, and how to communicate with the transponder.

To further facilitate communications, one or more communication flags 77, 78 may be used to alert either the dispenser 14 or vehicle control system 100 to the presence of information in one of the message buffers or the status of a message buffer. For example, a dispenser may be configured to only write to a message buffer when a communication flag 77, 78 is set, reset, or contains a specific value. The dispenser 14 may set, reset, or change the communication flag 77, 78 upon reading a message from a buffer or writing a message to a buffer. Alternatively, the basic memory access and communication control may change the communication flag status upon a successful read or write operation and, optionally, send an acknowledgement that the operation was completed successfully. Preferably, an acknowledgement is only sent during a read operation. Another alternative is to read the information that was just written to the buffer to check successful completion of the operation. Furthermore, during any communication flag check or memory access operation, one or more communication flags may be changed by the transponder buffer, dispenser or vehicle control system as necessary, depending on the configuration of those systems.

The vehicle control system, in cooperation with the controller 80, memory 81 and communication electronics 82, may operate in a similar fashion to the dispenser in order to read and write information to the various buffers, check the various communication flags, and provide various types of communications to and through the transponder buffer via the transmitter 83 and receiver 85.

Given the known presence of the transponder buffer to the vehicle control system 100, additional control over the transponder buffer 10 may be exerted by the vehicle control system. This control may he exerted in a way to eliminate the need for one, two or all of the communication flags because the vehicle control system will know when information is successfully written to a buffer, read from a buffer, and/or when the dispenser is working through the transponder buffer. For example, if the dispenser 14 polls the transponder buffer 10, a signal or interrupt may be sent to the vehicle control system 100. Alternatively, the vehicle control system 100 may periodically poll the transponder buffer to detect dispenser activity using the various communication flags, thereby checking the buffer for message content or checking other status registers. Preferably, the memory 64 is configured to include random access memory, read-only memory, as well as various registers within or associated with the basic memory access and communication control circuitry 64.

Figure 4A:
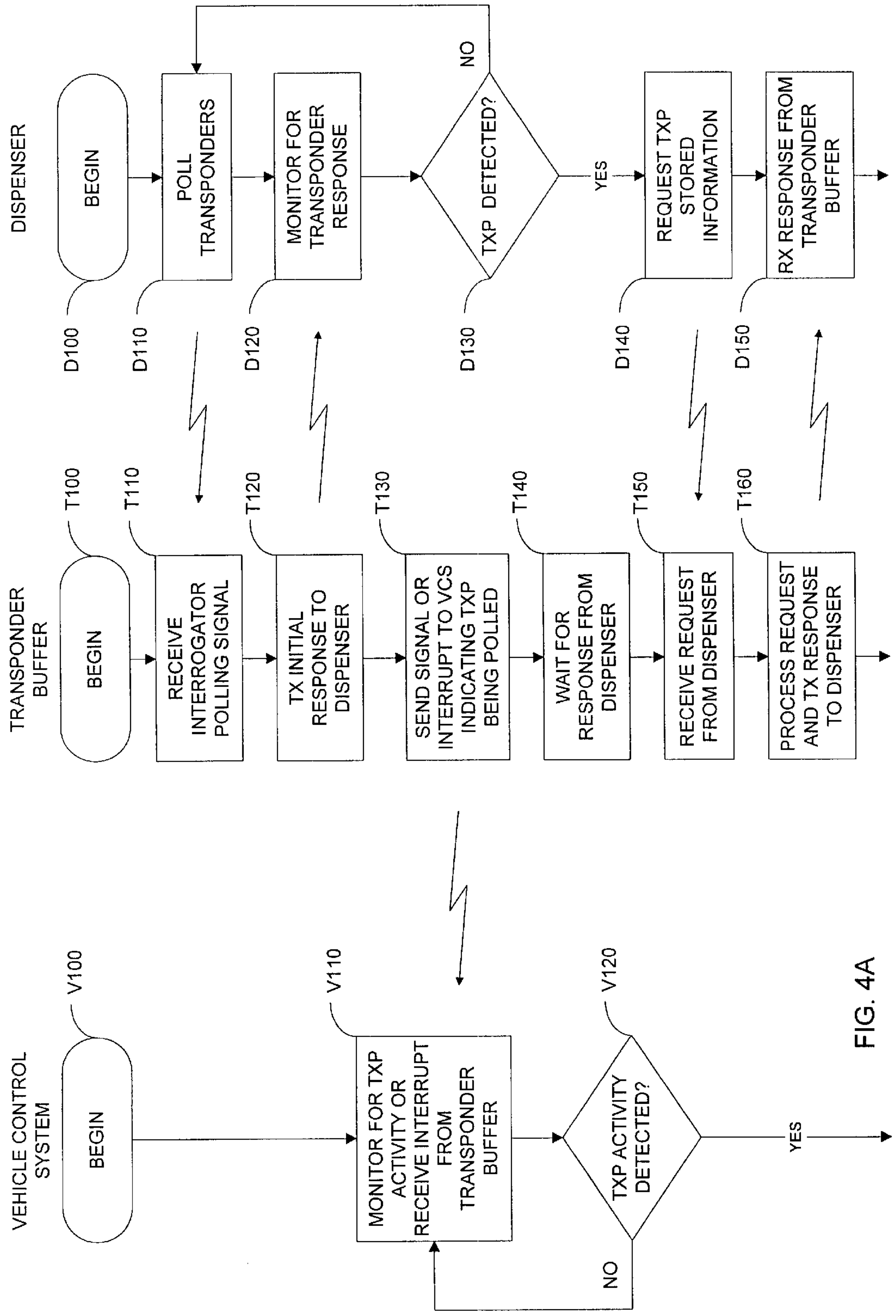
FIGS. 4A and 4B are a flow chart representing various basic modes of operation of a transponder buffer in cooperation with a vehicle control system and a fuel dispenser.
Figure 4B:
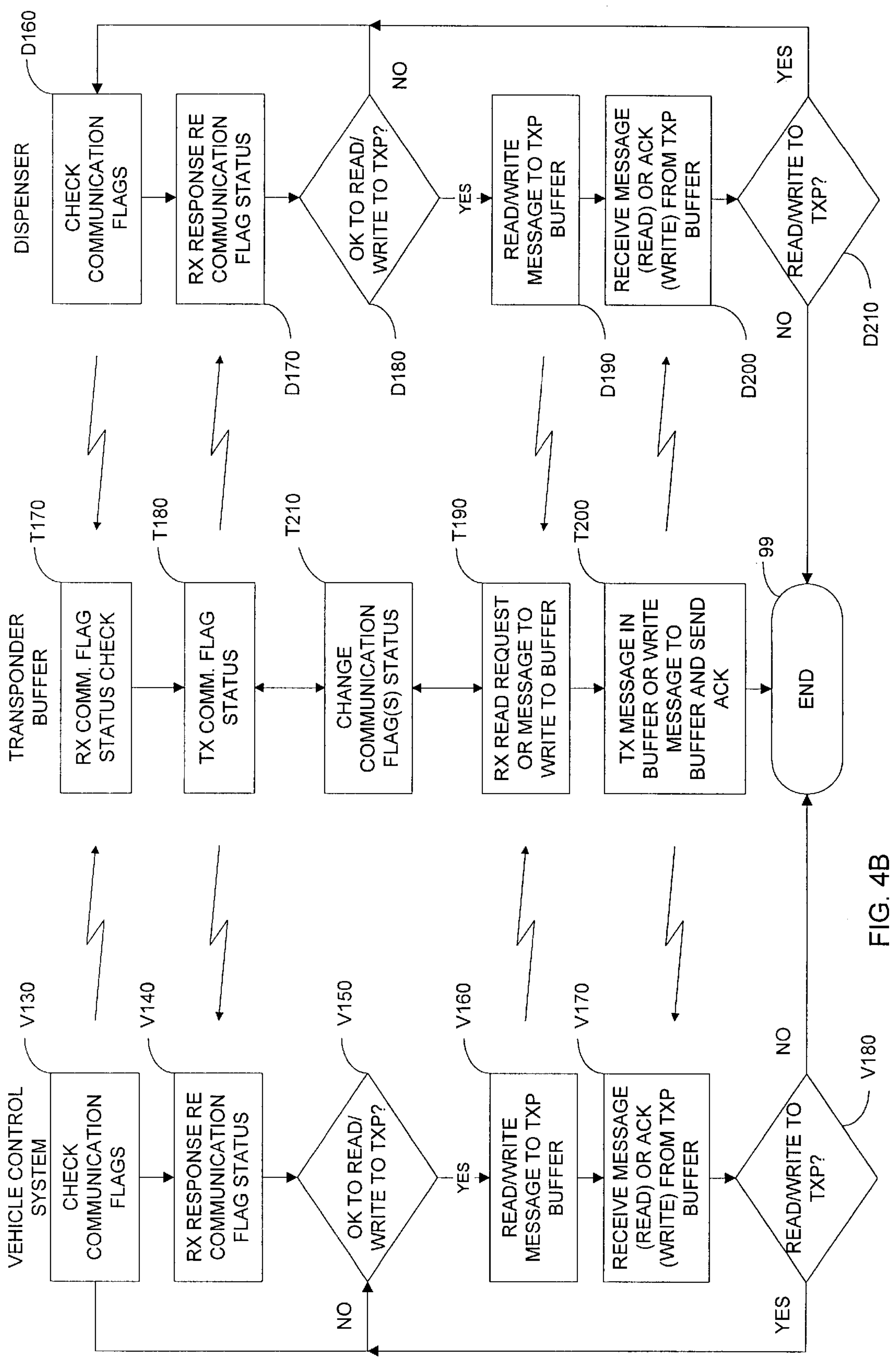

With reference to the flowcharts of FIGS. 4A and 4B, various operational aspects of the invention are shown in conjunction; however, these aspects are considered individually novel. The flowcharts depict the operational flow of a vehicle control system, transponder buffer, and dispenser according to the basic concepts of the present invention. Each of the operations begins at blocks B100, T100, and D100, respectively. The specific blocks are referenced in parentheses hereinafter, for improved readability. At some point, a car having a transponder buffer will enter the fueling environment and pull up to a fueling position associated with the fuel dispenser 14. During this time, the dispenser 14 will poll for transponders (block D110) and monitor for the presence of a transponder (block D120). When the transponder buffer becomes within range of the dispenser's interrogation signals, the transponder buffer will receive the interrogation polling signal (block T110) and establish communications by transmitting an initial response to the dispenser (block T120). Preferably, the information transmitted is pulled from the basic information buffer 74 to insure an immediate response during the initial communications between the transponder buffer and the dispenser 14. However, the information may come from one of the message buffers 75, 76 where the information was stored during an earlier communication or information written to the transponder buffer from the vehicle control system upon being interrogated, wherein the vehicle control system wrote information to the transponder message buffer for access by or transmission to the dispenser. However, it is preferable to have sufficient information stored on the transponder to quickly establish communications with the dispenser upon initial interrogation.

Once the transponder buffer transmits the initial response to the dispenser (at block T120), a signal or interrupt may be sent to the vehicle control system indicating the transponder has been polled (block T130). At that point, the transponder buffer will wait for a response from the dispenser (block T140).

The dispenser in the meantime will monitor for a response from the transponder (bock D120) and determine whether a transponder has been detected (block D130). If a transponder is not detected, the dispenser 14 will continue to poll for a transponder. If a transponder is detected, the dispenser may request information stored on the transponder (block D140) by transmitting a request to the transponder buffer. The transponder buffer will receive the request from the dispenser (block T150), process the request and transmit a response to the dispenser (block T160). The dispenser 14 will receive the response from the transponder buffer (block D150).

Figure 5:
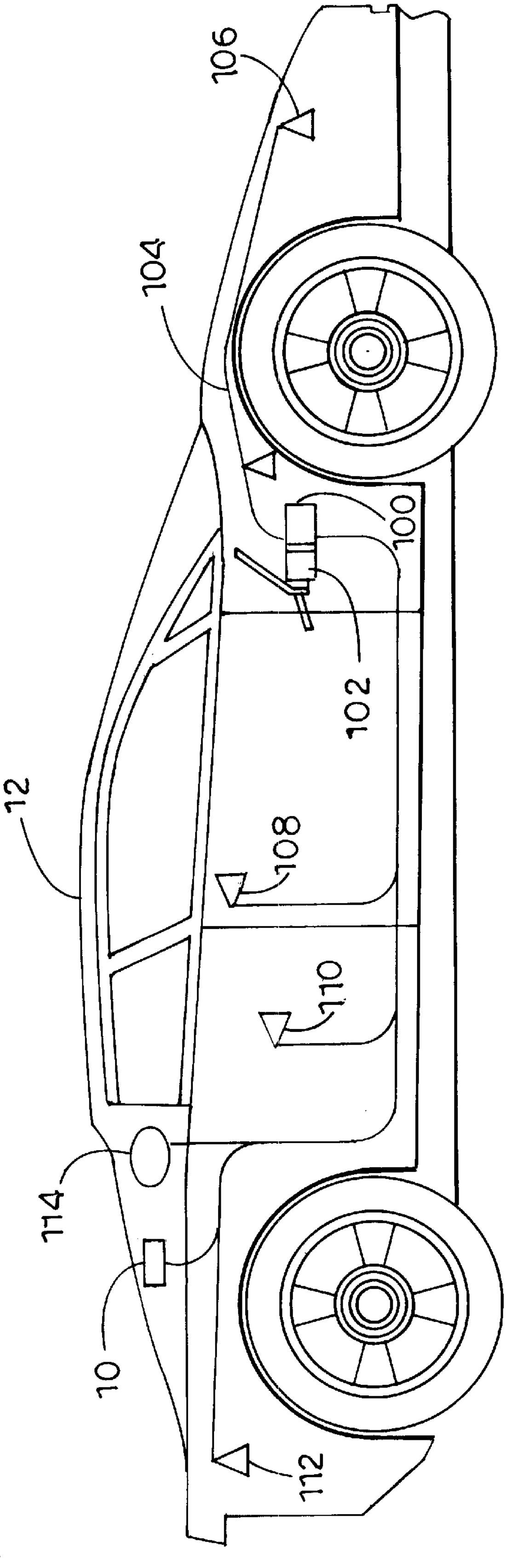
FIG. 5 is a block diagram of a vehicle having a transponder buffer and other peripheral devices.

Referring now to FIG. 5, a vehicle 12 is shown equipped with an "intelligent" vehicle controller 100 providing interactive multimedia access for the driver and the passengers via the transponder buffer 10. The intelligent vehicle controller 100, hereinafter referred as the IVC, is designed to provide bidirectional access via various communication systems and networks to systems and people apart from the vehicle. The IVC may provide an interactive communication medium allowing customers to interface remote systems to receive advertising and merchandising indicia and, in return, order and provide payment for selected items from within the vehicle. The IVC may also facilitate monitoring, reconfiguration and transfer of various types of vehicle data, such as operational, diagnostic or emission information.

The IVC 100 may be permanently integrated in the vehicle interior with vehicle's electronic system or be configured to removably interface with the electronic system and remain portable between vehicles. In a portable configuration, an interface or docking station 102 is preferable to couple the IVC 100 to the transponder buffer and any desired vehicle systems.

The vehicle shown in FIG. 5 is equipped with an IVC 100 coupled to an occupant interface 102 via a vehicle mounted docking interface 118. The docking interface 118 is preferably coupled via a bus or wiring network 104 to various vehicle systems and/or sensors 106–112. The IVC 100 either directly or through the docking interface 118 and/or the network 104 will interface with any necessary electronics. The IVC 100 may also either directly or indirectly cooperate with the vehicle's fueling system 114, including any onboard recovery vapor recovery (ORVR) equipment. Thus, the IVC may have separate processing capability or share processing capability with the another vehicle control system, depending on the amount of integration and the configuration of the IVC and vehicle.

Figure 6:
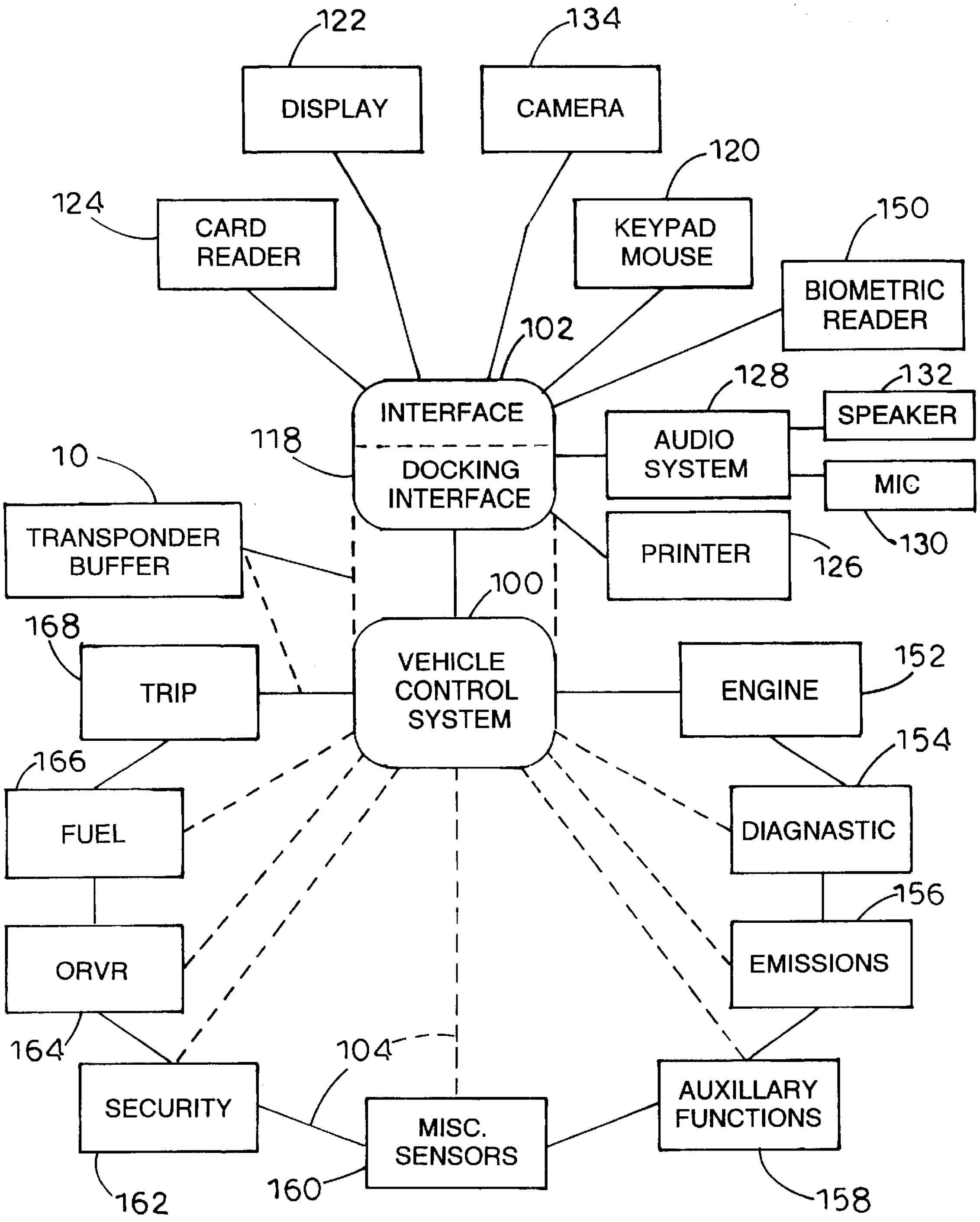
FIG. 6 is a block diagram of a complex vehicle control system and an associated transponder buffer.

As shown in FIG. 6, the IVC 100 may include the occupant interface 102, which may also be associated with a card reader or biometric reader 124, a user input means, such as a keypad, mouse or touch screen electronics 120, a video display 122, a card reader 124, and a printer 126. These features cooperate to provide a basic multimedia interface and means for paying for items ordered through the IVC 100. Additionally, the IVC may include or be associated with an audio system 128, microphone 130 and speaker 132 for providing a bi-directional audio intercom with a corresponding remote system, such as a quick-serve restaurant.

A camera 134 may be provided to receive images of the vehicle's occupants to enhance an audio intercom system with one or two direction video. With such a system, an order entry operator at a quick-serve restaurant and the vehicle occupant would be able to see and hear each other during order placement. For information providing like audio and video intercom interface at a dispenser, attention is drawn to U.S. application Ser. No. 08/659,304 filed Jun. 6, 1996 entitled Fuel Dispenser/Operator Intercom System and the continuation application filed Feb. 10, 1998, the disclosure of which is incorporated herein by reference.

A biometric reader 150 may also be coupled to the IVC to provide additional authorization or identification means for vehicle occupants. The biometric reader 150 may read the occupant's fingerprints, voice print, retinal scan or other biometric indicia to provide a substantially secure authorization. Such authorization or identification is preferably used in cooperation with financial information stored in the IVC or retrieved via the card reader 124. Biometric templates corresponding to the authorized card holder or occupant may be stored on a card read by the card reader, in the IVC remote system or on a network for comparison with the actual biometric indicia provided by the biometric reader 150.

It is also envisioned that the IVC (or basic vehicle control system) 100 will be capable of controlling various engine functions 152, diagnostic systems 154, emission systems 156, and any number of auxiliary functions 158 or miscellaneous sensors 160. The control system may also interact with the vehicle security system 162, on-board vapor recovery equipment 164, fuel status sensors 166, and trip-related features and functions 168. The IVC vehicle control system 100 will be able to monitor diagnostic or emission systems of the vehicle and communicate related information to the occupants of the vehicle and/or a remote system via the transponder buffer 10 for further identification or processing of vehicles with diagnostic or emission problems or malfunctions.

For example, during a fueling operation at a fuel station, any diagnostic or emission problems may be forwarded through the transponder buffer to a corresponding interrogator or dispenser communication system and on to the proper authorities or the fuel station store. Providing such information to the fuel station provides a marketing opportunity for service equipped stations to address or correct any diagnostic or emission problems, as well as a system for endorsing government regulations. Similarly, security breaches, such as theft of the vehicle, may be reported in like manner.

With respect to fueling, information relating the amount of fuel, the size of the vehicle fuel tank and the type of the vehicle fuel tank may be transferred onto the fuel station store or fuel dispenser. This information may be used to control robotic or automatic fueling, and tailor a fueling operation to a particular vehicle in order to maximize delivery rates, fuel quality or octane levels. The fueling information may include quantity, ullage, quality or octane readings. For those vehicles equipped with ORVR equipment, the status, type, efficiency and other related ORVR information may be communicated to the dispenser's vapor system in order to control vapor recovery at the dispenser and/or vehicle to maximize the vapor recovery effort while minimizing ingestion of non-hydrocarbon saturated air into the underground fuel tanks.

For additional information relating to communications between the vehicle and a dispenser or dispensing system, attention is directed to U.S. patent application Ser. Nos. 08/650,917 filed May 17, 1996, entitled Precision Fuel Dispenser; Ser. No. 08/649,455 filed May 17, 1996, entitled Onboard Vapor Recovery Detection; Ser. No. 08/759,733 filed Dec. 6, 1996, entitled Intelligent Fueling; Ser. No. 09/094,999 filed Jun. 15, 1998, entitled Transponder Communication of ORVR Presence; Ser. No. 09/034,969 filed Mar. 4, 1998, entitled Multistage Ordering System for a Fueling and Retail Environment; and Ser. No. 09/024,742 filed Feb. 17, 1998, entitled Fuel Dispensing System Providing Customer Preferences. The disclosures of these references are incorporated herein by reference.

As those of ordinary skill in the art will recognize, there are a number of hardware configurations capable of providing the functionality described in association with the intelligent vehicle controller. The IVC provides an integrated or portable user interface for vehicle occupants to communicate with systems remote to the vehicle. The IVC provides full function audio, video and graphics, as well as means to receive occupant input, transactional information and vehicle identification. The IVC and other vehicle systems are configured to provide information transfer relating to both the vehicle and occupants while providing a secure, merchandising and order entry system within the vehicle.

As noted, the vehicle control system will monitor for transponder activity or receive information from the transponder buffer (block V110) and determine if transponder activity has been detected (block V120). Once transponder activity is detected, the vehicle control system prepares for communications with the dispenser through the transponder buffer. Similarly, the dispenser 14 may communicate with the vehicle control system through the transponder buffer. Up to this point, the dispenser has established communications and may have received information that was stored on the transponder buffer. In this example, information has not been transferred from the vehicle control system to the dispenser or from the dispenser to the vehicle control system.

Message transfer between these systems is outlined in the portion of the flowcharts shown in FIG. 4B. In the preferred embodiment, the vehicle control system and dispenser interact with the transponder buffer in like fashion. Although the communication type and protocols may differ, both the vehicle control system and dispenser basically write and read information to and from the transponder buffer in cooperation with the other system. Initially, the dispenser may decide to write or read information to or from the transponder buffer and will preferably check a communication flag (block D160) and transmit a communication flag check signal to the transponder buffer.

The transponder buffer will receive the communication flag status check signal (block T170) and transmit the communication flag status (block T180) back to the dispenser. The dispenser will receive the response from the transponder buffer regarding the communication flag status (block D170) and determine whether it is proper to read information from the buffer or write information to the transponder buffer (block D180). If the flags indicate it is not proper to read or write to the transponder, the communication flags may be checked periodically. If the communication flags are configured for a read or write operation, either a message is written to the transponder buffer or a request to read a message from the buffer is transmitted to the transponder buffer (block D190). The transponder buffer will receive the message or request (block T190).

If the message is written to the buffer, the message will be stored in one of the message buffers; if a read request was received, the message in the buffer will be transmitted back to the dispenser (block T200). If a message was written to the buffer, an acknowledgement may be sent back to the dispenser. The dispenser will receive the message or an acknowledgement from the transponder buffer (block D200) accordingly, and determine whether or not another read or write operation is necessary (block D210) wherein the process either repeats if further communications are required, or the process comes to an end (block 99).

In similar fashion, the vehicle control system may start the communication process by checking communication flags (block V130), receiving a response regarding the communication flag status from the transponder buffer (block V140), and determining whether it is proper to read or write to the transponder (block V150). Assuming a read or write function is proper, a message is sent to the transponder buffer or a request to read information in the buffer is sent to the transponder buffer (block V160). The vehicle control system will receive a message back (on a read command) or receive an acknowledgement from the transponder buffer (on a write command). During the communications, the transponder buffer is substantially acting in the same way with the vehicle control system as it did in the dispenser control system as discussed above. Upon any read or write command, from either the vehicle control system or the dispenser, additional signals from the vehicle control system, dispenser control system, or internally from the access and communication control circuitry 70 of the transponder buffer 10, the one or more communication flags may be changed to indicate a change in transponder status or indicate memory is ready for a read or write command.

Preferably, the transponder will independently be able to establish its presence to the dispenser, but will not handle any requests until the on-board vehicle control system directs it to do so. Once communications are established with the dispenser, the dispenser may request the customer ID to begin authorization of a fueling process. The transponder may send a message onto a data bus or directly to the on-board vehicle control system. The on-board vehicle control system may allow a customer to preselect whether automatic authorization or manual authorization is desired. If the configuration is for automatic authorization, then the vehicle control system may either send the customer ID to the transponder to be sent to the fuel dispenser, or the vehicle control system may simply give permission to the transponder to send its stored customer ID to the fuel dispenser. By sending such information to the dispenser, the transponder may actually transmit information received by the vehicle control system automatically or simply provide the dispenser access to the information as described above.

The fuel dispenser will typically send the customer ID to the central site controller 16, which will in turn send it to the host network 18 to be associated with a customer's debit/credit card or account. Optionally, various account information may be transmitted from the transponder buffer or from the vehicle control system in a fashion similar to the customer ID. The host computer will authorize the transaction, if such action is proper, and provide sufficient information to the fuel dispenser to allow dispensing of fuel to the vehicle. Depending on site configuration, customers may be allowed to dispense fuel while authorization is in progress or may require authorization prior to dispensing fuel.

Once the fueling process has been initiated, additional communications may occur between the vehicle and fuel dispenser. Effectively, any peripherals that are connected to the vehicle control system may communicate with any services or data networks that are connected to the fuel dispenser and/or site controller 16 via the transponder buffer.

For instance, the on-board computer may be configured to retrieve the customer's e-mail from a data network service. The vehicle control system would send a request to the transponder to inquire if the fuel dispenser is capable of establishing such a connection. The dispenser will access the request and, if configured to obtain e-mail, the dispenser, with or without the aid of the site controller 16, will establish a connection and transmit the message to the transponder buffer for access by the vehicle control system. The transponder's one or more message buffers are used generically to transmit any type of message request so long as both the vehicle control system and the fuel dispenser are able to determine a proper starting location and length for a given message (including requests therefor). This system must also support a common messaging protocol service.

Once the vehicle control system learns from the dispenser that such communications are proper, the vehicle control system may send to the transponder the customer's account number, password or any necessary information required to initiate such communications. The fuel dispenser will access the information and establish the communication. At this point, the customer may initiate transactions directly with the vehicle control system, through a peripheral on-board the vehicle or a peripheral coupled to the vehicle control system, such as a laptop computer. Importantly, the vehicle control system may be preprogrammed to perform various transactions as supported by the dispenser and associated site controller. For instance, if the customer wants to download his e-mail from the data network, the fuel dispenser, through its connection via the transponder buffer, can simply download the information to the transponder. The fuel dispenser would download sufficient information to fill the transponder buffer's capacity, the transponder would empty the buffer to the vehicle control system and signal the fuel dispenser to download the next part of the message until the complete message is downloaded. Notably, the transponder buffer may act to alert the dispenser to continue the message retrieval or the vehicle control system may simply read the information, set a communication flag, and allow the dispenser to determine if it is proper to write the next part or a remaining part of the message. Those skilled in the art will quickly recognize the various protocols for using the transponder as a buffer to facilitate bidirectional communications between a vehicle and the remote communication system, such as the fuel dispenser.

The vehicle control system may vary in complexity from a very basic control system providing limited amounts of information to the dispenser and requiring like amounts from the dispenser. Optionally, the control system may be associated with a user interface within the vehicle and configured to monitor various aspects of the vehicle's operation, as well as provide communications between occupants of the vehicle and the remote communication system configured to communicate with the transponder buffer.

Certain modifications and improvements will occur to those skilled in the art upon reading the foregoing description. It should be understood that all such modifications and improvements have been deleted herein for the sake of conciseness and readability, but are properly within the scope of the following claims.

I claim:

1. A transponder buffer facilitating asynchronous communications between a vehicle control system and a remote radio frequency communication system, said transponder buffer, comprising:

a. a housing mountable to the vehicle;

b. communication and memory access control circuitry associated with communication electronics and memory within said housing;

c. said communication electronics adapted to provide bi-directional communications with the vehicle control system and the remote radio frequency communication system; and d. said communication and memory access control circuitry adapted to:

i. store data received by said communication electronics from the vehicle control system and received by the remote radio frequency communication system in said memory; and ii. transmit data received from the vehicle control system and stored in said memory to the remote radio frequency communication system and transmit data received from the remote radio frequency communication system and stored in the memory to the vehicle control system;

said communication and memory access control circuitry is further adapted to transmit data received from the vehicle control system and stored in said memory to the remote radio frequency communication system upon receiving a signal for retrieving the data from the remote radio frequency communication system via said communication electronics; and said transponder buffer further comprising a memory associated with said communication and memory access control circuitry for storing a data status flag, said communication and memory access control circuitry further adapted to receive a flag status check signal from the remote radio frequency communication system and transmit a flag status signal corresponding to the data status flag to the remote radio frequency communication system via said communication electronics.

2. The transponder buffer of claim 1, wherein said communication and memory access control circuitry is further adapted to transmit data received from the remote radio frequency communication system and stored in said memory to the vehicle control system upon receiving a signal for retrieving the data from the vehicle control system via said communication electronics.

3. The transponder buffer of claim 1, wherein said communication and memory access control circuitry is further adapted to:

a. transmit data received from the vehicle control system and stored in said memory to the remote radio frequency communication system upon receiving a signal for retrieving the data from the remote radio frequency communication system via said communication electronics; and b. transmit data received from the remote radio frequency communication system and stored in said memory to the vehicle control system upon receiving a signal for retrieving the data from the vehicle control system via said communication electronics.

4. The transponder buffer of claim 3, further comprising a memory associated with said communication and memory access control circuitry for storing first and second data status flags, said communication and memory access control circuitry further adapted to:

a. receive a flag status check signal from the remote radio frequency communication system and transmit a flag status signal corresponding to the first data status flag to the remote radio frequency communication system via said communication electronics; and b. receive a flag status check signal from the vehicle control system and transmit a flag status signal corresponding to the second data status flag to the vehicle control system via said communication electronics.

5. A transponder buffer facilitating asynchronous communications between a vehicle control system and a remote radio frequency communication system, said transponder buffer, comprising:

a. a housing mountable to the vehicle;

b. communication and memory access control circuitry associated with communication electronics and memory within said housing;

c. said communication electronics adapted to provide bi-directional communications with the vehicle control system and the remote radio frequency communication system; and d. said communication and memory access control circuitry adapted to:

i. store data received by said communication electronics from the vehicle control system and received by the remote radio frequency communication system in said memory; and ii. transmit data received from the vehicle control system and stored in said memory to the remote radio frequency communication system and transmit data received from the remote radio frequency communication system and stored in the memory to the vehicle control system;

said communication and memory access control circuitry is further adapted to transmit data received from the remote radio frequency communication system and stored in said memory to the vehicle control system upon receiving a signal for retrieving the data from the vehicle control system via said communication electronics; and said transponder buffer further comprising a memory location associated with said communication and memory access control circuitry for storing a data status flag, said communication and memory access control circuitry further adapted to receive a flag status check signal from the vehicle control system and transmit a flag status signal corresponding to the data status flag to the vehicle control system via said communication electronics.

6. The transponder buffer of claim 5, wherein said communication and memory access control circuitry is further adapted to transmit data received from the vehicle control system and stored in said memory to the remote radio frequency communication system upon receiving a signal for retrieving the data from the remote radio frequency communication system via said communication electronics.

7. The transponder buffer of claim 6, further comprising a memory associated with said communication and memory access control circuitry for storing a data status flag, said communication and memory access control circuitry further adapted to receive a flag status check signal from the remote radio frequency communication system and transmit a flag status signal corresponding to the data status flag to the remote radio frequency communication system via said communication electronics.

8. The transponder buffer of claim 5, wherein said communication and memory access control circuitry is further adapted to:

a. transmit data received from the vehicle control system and stored in said memory to the remote radio frequency communication system upon receiving a signal for retrieving the data from the remote radio frequency communication system via said communication electronics; and b. transmit data received from the remote radio frequency communication system and stored in said memory to the vehicle control system upon receiving a signal for retrieving the data from the vehicle control system via said communication electronics.

9. The transponder buffer of claim 8, further comprising a memory associated with said communication and memory access control circuitry for storing first and second data status flags, said communication and memory access control circuitry further adapted to:

a. receive a flag status check signal from the remote radio frequency communication system and transmit a flag status signal corresponding to the first data status flag to the remote radio frequency communication system via said communication electronics; and b. receive a flag status check signal from the vehicle control system and transmit a flag status signal corresponding to the second data status flag to the vehicle control system via said communication electronics.

10. A transponder buffer facilitating asynchronous communications between a vehicle control system and a remote radio frequency communication system, said transponder buffer, comprising:

a. a housing mountable to the vehicle;

b. communication and memory access control circuitry associated with communication electronics and memory within said housing;

c. said communication electronics adapted to provide bidirectional communications with the vehicle control system and the remote radio frequency communication system; and d. said communication and memory access control circuitry adapted to:

i. store data received by said communication electronics from the vehicle control system and received by the remote radio frequency communication system in said memory; and ii. transmit data received from the vehicle control system and stored in said memory to the remote radio frequency communication system and transmit data received from the remote radio frequency communication system and stored in the memory to the vehicle control system;

said communication and memory access control circuitry is further adapted to:

a. transmit data received from the vehicle control system and stored in said memory to the remote radio frequency communication system upon receiving a signal for retrieving the data from the remote radio frequency communication system via said communication electronics; and b. transmit data received from the remote radio frequency communication system and stored in said memory to the vehicle control system upon receiving a signal for retrieving the data from the vehicle control system via said communication electronics;

said transponder buffer further comprising a memory associated with said communication and memory access control circuitry for storing first and second data status flags, said communication and memory access control circuitry further adapted to:

a. receive a flag status check signal from the remote radio frequency communication system and transmit a flag status signal corresponding to the first data status flag to the remote radio frequency communication system via said communication electronics, and b. receive a flag status check signal from the vehicle control system and transmit a flag status signal corresponding to the second data status flag to the vehicle control system via said communication electronics.

11. A transponder buffer facilitating asynchronous communications between a vehicle control system and a remote radio frequency communication system, said transponder buffer comprising:

a. communication electronics configured to provide bidirectional communications to the vehicle control system and the remote radio frequency communication system;

b. communication and memory access control circuitry;

c. a first memory location associated with said communication and memory access control circuitry for storing data;

d. a second memory location associated with said communication and memory access control circuitry for storing a communication flag indicative of a state of the first memory location;

e. said communication and memory access control circuitry adapted to:

i. store data received by said communication electronics from the vehicle control system and the remote radio frequency communication system in said first memory location; and ii. transmit data received from the vehicle control system and stored in said first memory location to the remote radio frequency communication system and transmit data received from the remote radio frequency communication system and stored in the first memory location to the vehicle control system;

iii. transmit a signal indicative of the state of the communication flag in the second memory location upon receiving a signal requesting communication flag status;

iv. change the communication flag status upon receiving a signal to change the communication flag status;

f. a housing mountable to a vehicle for housing said communication electronics, said memory locations and said communication and memory access control circuitry.

12. A transponder buffer of claim 11 further comprising a third memory location associated with said communication and memory access control circuitry for storing a second communication flag indicative of a state of the first memory location wherein the first communication flag corresponds to a state of the data received from the vehicle control system to be transmitted to the remote radio frequency communication system and the second communication flag corresponds to a state of the data received from the remote radio frequency communication system to be transmitted to the vehicle control system.

13. A transponder buffer of claim 12 wherein said first memory location is divided into two partitions, one partition for data received from the vehicle control system to be transmitted to the remote radio frequency communication system and one partition for data received from the remote radio frequency communication system to be transmitted to the vehicle control system.

* * * * *